US011045891B2

(12) United States Patent
Hutchison et al.

(10) Patent No.: US 11,045,891 B2
(45) Date of Patent: Jun. 29, 2021

(54) SYSTEMS AND METHODS FOR ANOMALOUS CATHODE EVENT CONTROL

(71) Applicant: ILLINOIS TOOL WORKS INC., Glenview, IL (US)

(72) Inventors: Richard Martin Hutchison, Iola, WI (US); Caleb Haven, Appleton, WI (US); Bryan Dustin Marschke, Golden, CO (US); Peter Donald Mehn, Oshkosh, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 369 days.

(21) Appl. No.: 14/291,972

(22) Filed: May 30, 2014

(65) Prior Publication Data

US 2014/0367370 A1 Dec. 18, 2014

Related U.S. Application Data

(60) Provisional application No. 61/834,738, filed on Jun. 13, 2013.

(51) Int. Cl.
*B23K 9/095* (2006.01)
*B23K 9/10* (2006.01)
(Continued)

(52) U.S. Cl.
CPC ............ *B23K 9/0953* (2013.01); *B23K 9/091* (2013.01); *B23K 9/1043* (2013.01); *B23K 9/1062* (2013.01); *B23K 9/173* (2013.01)

(58) Field of Classification Search
CPC .... B23K 9/0953; B23K 9/173; B23K 9/1043; B23K 9/091; B23K 9/1062
(Continued)

(56) References Cited

U.S. PATENT DOCUMENTS 2,365,958 A 12/1944 Holslag
2,416,047 A 2/1947 Dolan
(Continued)

FOREIGN PATENT DOCUMENTS

CA 2072711 12/1992
CN 2181354 11/1994
(Continued)

OTHER PUBLICATIONS

International Search Report from PCT application No. PCT/US2014/041201, dated Nov. 4, 2014, 11 pg.
(Continued)

*Primary Examiner* — Thien S Tran
(74) *Attorney, Agent, or Firm* — McAndrews, Held & Malloy, Ltd.

(57) ABSTRACT

A method of operating a welding system includes supplying a weld current and a weld voltage to an electrode via a plurality of pulse periods, where each pulse period of the plurality of pulse periods includes a background phase and a peak phase. The method also includes detecting the occurrence of an anomalous cathode event during the background phase of a first pulse period of the plurality of pulse periods based at least in part on when a voltage value of the weld voltage is greater than a detect voltage. The method also includes controlling the weld current to a desired current during a portion of the anomalous cathode event. The portion includes an interval of the background phase of the first pulse period, and the weld current is controlled independent of the weld voltage during the portion of the anomalous cathode event.

10 Claims, 3 Drawing Sheets

(51) Int. Cl.
*B23K 9/09* (2006.01)
*B23K 9/173* (2006.01)

(58) Field of Classification Search
USPC ........................................ 219/130.33, 130.51
See application file for complete search history.

(56) References Cited

U.S. PATENT DOCUMENTS 3,288,982 A 11/1966 Haruyoshi
3,725,629 A 4/1973 Vickers
3,809,853 A 5/1974 Manz
3,849,871 A 11/1974 Kaunitz
3,946,349 A 3/1976 Haldeman
4,160,967 A 7/1979 Beech
4,188,419 A 2/1980 Detert
4,222,023 A 9/1980 Beech
4,426,565 A 1/1984 Rueter
4,447,703 A 5/1984 Stol
4,493,971 A 1/1985 Nawa
4,531,040 A 7/1985 Nawa
4,536,634 A 8/1985 Nawa
4,546,234 A 10/1985 Ogasawara
4,580,026 A 4/1986 Stol
4,628,182 A 12/1986 Hori
4,631,385 A 12/1986 Rothermel
4,667,083 A 5/1987 Stol
4,728,761 A 3/1988 Mucha
4,897,523 A 1/1990 Parks
4,950,348 A 8/1990 Larsen
4,954,691 A 9/1990 Parks
4,973,821 A 11/1990 Martin
5,001,326 A 3/1991 Stava
5,043,557 A 8/1991 Tabata
5,086,207 A 2/1992 Deam
5,101,086 A 3/1992 Dion
5,118,028 A 6/1992 Ogawa
5,140,123 A 8/1992 Mitani
5,148,001 A 9/1992 Stava
5,208,433 A 5/1993 Hellegouarc
5,270,516 A 12/1993 Hamamoto
5,278,390 A 1/1994 Blankenship
5,315,089 A 5/1994 Hughes
5,319,179 A 6/1994 Joecks
5,343,023 A 8/1994 Geissler
5,349,156 A 9/1994 Madigan
5,352,871 A 10/1994 Ross
5,367,138 A 11/1994 Moss
5,412,184 A 5/1995 McGaffigan
5,461,215 A 10/1995 Haldeman
5,466,916 A 11/1995 Iguchi
5,504,309 A 4/1996 Geissler
5,526,561 A 6/1996 McGaffigan
5,710,413 A 1/1998 King
5,714,738 A 2/1998 Hauschulz
5,739,506 A 4/1998 Hanton
5,742,029 A 4/1998 Stava
5,756,967 A 5/1998 Quinn
5,773,799 A 6/1998 Maxfield
5,783,799 A 7/1998 Geissler
5,844,193 A 12/1998 Nomura
5,963,022 A 10/1999 Buda
5,968,587 A 10/1999 Frankel
6,002,104 A 12/1999 Hsu
6,008,470 A 12/1999 Zhang
6,043,471 A 3/2000 Wiseman
6,051,810 A * 4/2000 Stava .................... B23K 9/092 219/130.33
6,090,067 A 7/2000 Carter
6,107,602 A 8/2000 Geissler
6,115,273 A 9/2000 Geissler
6,169,263 B1 1/2001 Derby
6,204,476 B1 3/2001 Reynolds
6,248,976 B1 6/2001 Blankenship
6,265,688 B1 7/2001 Lyshkow
6,278,074 B1 8/2001 Morlock
6,292,715 B1 9/2001 Rongo
6,331,694 B1 12/2001 Blankenship
6,359,258 B1 3/2002 Blankenship
6,479,792 B1 11/2002 Beiermann
6,486,439 B1 11/2002 Spear
6,515,259 B1 2/2003 Hsu
6,583,386 B1 6/2003 Ivkovich
6,596,970 B2 7/2003 Blankenship
6,624,388 B1 9/2003 Blankenship
6,642,482 B2 11/2003 Rappl
6,670,579 B2 12/2003 Davidson
6,707,001 B1 3/2004 Ulrich
6,710,297 B1 3/2004 Artelsmair
6,720,529 B2 4/2004 Davidson
6,744,012 B2 6/2004 Ueda
6,747,247 B2 6/2004 Holverson
6,849,828 B2 2/2005 Aigner
6,906,284 B2 6/2005 Kim
6,909,067 B2 6/2005 Davidson
6,933,466 B2 8/2005 Hutchison
6,958,263 B2 10/2005 Bhattacharyya
6,974,931 B2 12/2005 Holverson
6,974,932 B2 12/2005 Holverson
6,984,806 B2 1/2006 Huismann
6,995,338 B2 2/2006 Hutchison
7,002,103 B2 2/2006 Holverson
7,129,443 B2 10/2006 Davidson
7,145,101 B2 12/2006 Tong
7,244,905 B2 7/2007 Das
7,265,320 B2 9/2007 Ou
7,304,269 B2 12/2007 Fulmer
7,307,240 B2 12/2007 Holverson
7,351,933 B2 4/2008 Huismann
7,683,290 B2 3/2010 Daniel
8,203,100 B2 6/2012 Ueda
8,288,686 B2 10/2012 Kaufman
8,487,215 B2 7/2013 Holverson
9,403,231 B2 8/2016 Hutchison
9,539,662 B2 1/2017 Hutchison
2002/0008095 A1 1/2002 Norrish
2002/0045970 A1 4/2002 Krause
2002/0107825 A1 8/2002 Manicke
2002/0117487 A1 8/2002 Corby
2002/0117488 A1 8/2002 Arndt
2003/0058149 A1 3/2003 Jayadeva
2004/0010342 A1 1/2004 Thelen
2004/0069759 A1 4/2004 Davidson
2004/0182828 A1 9/2004 Schmidt
2004/0222204 A1 11/2004 Hutchison
2004/0238511 A1 12/2004 Matus
2005/0184039 A1 8/2005 Stava
2005/0269306 A1 12/2005 Fulmer
2006/0163229 A1 7/2006 Hutchison
2007/0051711 A1* 3/2007 Kachline ............. B23K 9/1056 219/130.01
2007/0084840 A1 4/2007 Davidson
2007/0102407 A1 5/2007 Uezono
2007/0170163 A1 7/2007 Narayanan
2007/0235434 A1 10/2007 Davidson
2007/0267394 A1 11/2007 Beck
2008/0264916 A1 10/2008 Nagano
2008/0264917 A1* 10/2008 White ................... B23K 9/092 219/130.51
2008/0264923 A1 10/2008 White
2009/0026188 A1 1/2009 Schorghuber
2009/0173726 A1* 7/2009 Davidson ............ B23K 9/0956 219/130.01
2010/0059493 A1 3/2010 McAninch
2010/0096373 A1 4/2010 Hillen
2010/0133250 A1 6/2010 Sardy
2010/0176104 A1* 7/2010 Peters ................. B23K 9/0738 219/130.21
2010/0308026 A1 12/2010 Vogel
2010/0308027 A1 12/2010 Vogel
2010/0314371 A1 12/2010 Davidson
2011/0108527 A1 5/2011 Peters
2011/0114612 A1 5/2011 Holverson
2011/0163080 A1 7/2011 Beck

(56) References Cited

U.S. PATENT DOCUMENTS

| | | | | |
|---|---|---|---|---|
| 2011/0204034 | A1* | 8/2011 | Schartner | B23K 9/09 219/137 PS |
| 2011/0297658 | A1 | 8/2011 | Peters | |
| 2011/0248007 | A1 | 10/2011 | Takeda | |
| 2012/0024828 | A1 | 2/2012 | Oowaki | |
| 2012/0061362 | A1 | 3/2012 | Davidson | |
| 2012/0074112 | A1 | 3/2012 | Kotera | |
| 2012/0097655 | A1* | 4/2012 | Daniel | B23K 9/091 219/130.21 |
| 2012/0248080 | A1 | 10/2012 | Hutchison | |
| 2012/0291172 | A1 | 11/2012 | Wills | |
| 2012/0298642 | A1 | 11/2012 | Lambert | |
| 2013/0112674 | A1 | 5/2013 | Mnich | |
| 2013/0112676 | A1 | 5/2013 | Hutchison | |
| 2013/0264323 | A1 | 10/2013 | Daniel | |
| 2013/0270245 | A1 | 10/2013 | Holverson | |
| 2014/0021183 | A1 | 1/2014 | Peters | |
| 2014/0158669 | A1 | 6/2014 | Davidson | |
| 2014/0183176 | A1 | 7/2014 | Hutchison | |
| 2014/0217077 | A1 | 8/2014 | Davidson | |
| 2014/0251971 | A1 | 9/2014 | Hearn | |
| 2014/0263237 | A1 | 9/2014 | Daniel | |
| 2014/0263241 | A1 | 9/2014 | Henry | |
| 2014/0263243 | A1 | 9/2014 | Marschke | |
| 2015/0001197 | A1 | 1/2015 | Marschke | |
| 2015/0083702 | A1 | 3/2015 | Scott | |
| 2015/0105898 | A1 | 4/2015 | Adams | |
| 2016/0318112 | A1 | 11/2016 | Hutchison | |

FOREIGN PATENT DOCUMENTS

| | | | |
|---|---|---|---|
| CN | 1298778 | | 6/2001 |
| CN | 1496774 | | 5/2004 |
| CN | 1600486 | | 3/2005 |
| CN | 1640603 | | 7/2005 |
| CN | 1712168 | | 12/2005 |
| CN | 1714978 | | 1/2006 |
| CN | 1836818 | | 9/2006 |
| CN | 1871093 | | 11/2006 |
| CN | 101062530 | | 10/2007 |
| CN | 201098775 | | 8/2008 |
| CN | 101376191 | | 3/2009 |
| CN | 101804495 | | 8/2010 |
| CN | 101862886 | | 10/2010 |
| CN | 102470473 | | 5/2012 |
| CN | 102554418 | | 7/2012 |
| CN | 102596475 | | 7/2012 |
| CN | 102770228 | | 11/2012 |
| CN | 202824943 | | 3/2013 |
| DE | 2501928 | | 7/1976 |
| DE | 19808383 | | 9/1999 |
| EP | 0194045 | | 9/1986 |
| EP | 0387223 | | 9/1990 |
| EP | 1232825 | | 8/2002 |
| EP | 2218537 | | 8/2010 |
| EP | 2286949 | | 2/2011 |
| FR | 1443701 | | 6/1966 |
| JP | S5719166 | * | 2/1982 |
| JP | S57109573 | | 7/1982 |
| JP | S60108175 | | 6/1985 |
| JP | S60108176 | | 6/1985 |
| JP | S6471575 | | 3/1989 |
| JP | H03285768 | | 12/1991 |
| JP | H06277840 | | 10/1994 |
| JP | H07204848 | | 8/1995 |
| JP | H11156542 | | 6/1999 |
| JP | 2001276971 | | 10/2001 |
| JP | 2003311409 | | 11/2003 |
| JP | 2005034853 | | 2/2005 |
| JP | 2006205189 | | 8/2006 |
| JP | 2009072814 | | 4/2009 |
| JP | 4950819 | | 6/2012 |
| KR | 1020120027764 | | 3/2012 |
| SU | 872102 | | 10/1981 |
| WO | 9640465 | | 12/1996 |
| WO | 0132347 | | 5/2001 |
| WO | 0153030 | | 7/2001 |
| WO | 2005030422 | | 4/2005 |

OTHER PUBLICATIONS

International Search Report from PCT application No. PCT/US2014/017864, dated Aug. 22, 2014, 9 pgs.
International Search Report from PCT application No. PCT/US2015/045715, dated Jan. 7, 2016, 12 pgs.
"ALT 304," Miller—The Power of Blue, Jun. 2001.
"Maxstar 200 SD, DX, and LX," Miller Electric Mfg. Co., Oct. 2003.
Bondy et al., "Graph Theory with Appliations," University of Waterloo, 1976, p. 7-8.

* cited by examiner

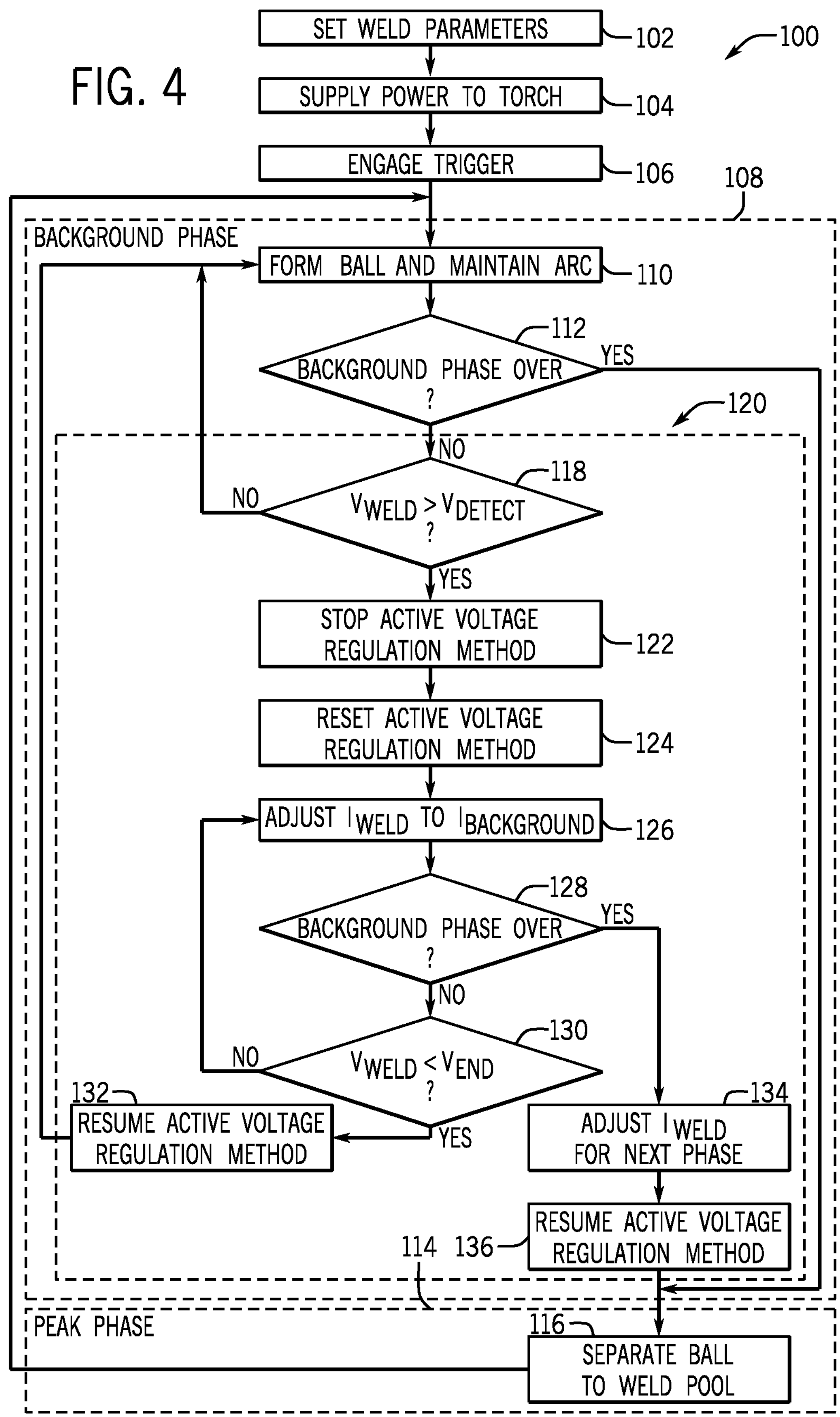
FIG. 4
100
SET WELD PARAMETERS
102
SUPPLY POWER TO TORCH
104
ENGAGE TRIGGER
106
108
BACKGROUND PHASE
FORM BALL AND MAINTAIN ARC
110
BACKGROUND PHASE OVER ?
112
YES
NO
120
VWELD > VDETECT ?
118
NO
YES
STOP ACTIVE VOLTAGE REGULATION METHOD
122
RESET ACTIVE VOLTAGE REGULATION METHOD
124
ADJUST IWELD TO IBACKGROUND
126
BACKGROUND PHASE OVER ?
128
YES
NO
VWELD < VEND ?
130
NO
YES
132
RESUME ACTIVE VOLTAGE REGULATION METHOD
134
ADJUST IWELD FOR NEXT PHASE
RESUME ACTIVE VOLTAGE REGULATION METHOD
114
136
PEAK PHASE
116
SEPARATE BALL TO WELD POOL

SYSTEMS AND METHODS FOR ANOMALOUS CATHODE EVENT CONTROL

CROSS-REFERENCE TO RELATED APPLICATION

This application claims priority from and the benefit of U.S. Provisional Application Ser. No. 61/834,738, entitled "ANOMALOUS CATHODE EVENT CONTROL," filed Jun. 13, 2013, which is hereby incorporated by reference in its entirety for all purposes.

BACKGROUND

The invention relates generally to welding systems, and particularly to control of welding systems for gas-metal arc welding (GMAW).

Arc welding systems generally include a power source that applies electrical current to an electrode so as to pass an arc between the electrode and a work piece, thereby heating the electrode and work piece to create a weld. In many systems, the electrode consists of a wire that is advanced through a welding torch. During the welding process, portions of the molten wire are deposited on the work piece via the arc. Unfortunately, instabilities of the arc affect the application of the electrode to the weld.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment, a welding system includes a power source and control circuitry coupled to the power source. The power source is configured to supply weld power to a torch in a plurality of pulse periods, wherein each pulse period includes a peak phase and a background phase. The weld power includes a weld current and a weld voltage. The control circuitry is configured to control the weld current to a background current when a voltage value of the weld voltage is greater than a detect voltage in the background phase.

In another embodiment, a method of operating a welding system includes supplying a weld current and a weld voltage to an electrode via a plurality of pulse periods, where each pulse period of the plurality of pulse periods includes a background phase and a peak phase. The method also includes detecting the occurrence of an anomalous cathode event during the background phase of a first pulse period of the plurality of pulse periods based at least in part on when a voltage value of the weld voltage is greater than a detect voltage. The method also includes controlling the weld current to a desired current during a portion of the anomalous cathode event. The portion includes an interval of the background phase of the first pulse period, and the weld current is controlled independent of the weld voltage during the portion of the anomalous cathode event.

In another embodiment, a method of operating a welding system includes supplying a weld current at a peak current value and a weld voltage at a peak voltage value to a welding wire in a first peak phase of a first pulse period. The weld current is indirectly controlled based at least in part on the weld voltage during the first peak phase. The method also includes supplying the weld current at a background current value and the weld voltage at a background voltage value to the welding wire at a first portion of a background phase of the first pulse period. The method also includes controlling the weld current to the background current value independent of the weld voltage during a second portion of the background phase of the first pulse period, wherein the second portion of the background phase includes an anomalous cathode event.

DRAWINGS

These and other features, aspects, and advantages of the present invention will become better understood when the following detailed description is read with reference to the accompanying drawings in which like characters represent like parts throughout the drawings, wherein:

FIG. 4 is a flow chart illustrating steps to control current during an anomalous cathode event.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
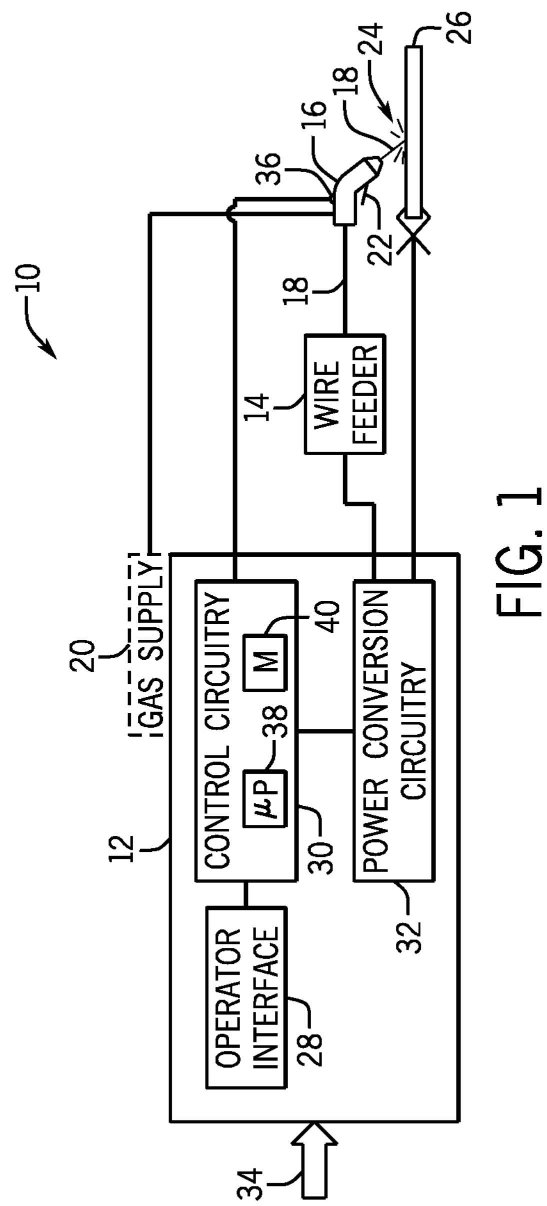
FIG. 1 is an embodiment of a MIG welding system with a power source and a wire feeder.

Turning now to the drawings, and referring first to FIG. 1, an exemplary welding system 10 is illustrated as including a power source 12 coupled to a wire feeder 14. In the illustrated embodiment the power source 12 is separate from the wire feeder 14, such that the wire feeder 14 may be positioned at some distance from the power source 12 near a welding location. However, it should be understood that the wire feeder 14, in some implementations, may be integral with the power source 12. The power source 12 may supply weld power to a torch 16 through the wire feeder 14, or the power source 12 may supply weld power directly to the torch 16. The wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. An operator may engage a trigger 22 of the torch 16 to initiate an arc 24 between the electrode 18 and a work piece 26. In some embodiments, the welding system 10 may be triggered by an automation interface, including, but not limited to a programmable logic controller (PLC) or robot controller. The welding system 10 is designed to provide welding wire (e.g., electrode 18), weld power, and shielding gas to the welding torch 16. As will be appreciated by those skilled in the art, the welding torch 16 may be of many different types, and may facilitate use of various combinations of electrodes 18 and gases.

The welding system 10 may receive data settings from the operator via an operator interface 28 provided on the power source 12. The operator interface 28 may be incorporated into a faceplate of the power source 12, and may allow for selection of settings such as the weld process (e.g., stick, TIG, MIG), the type of wire to be used, voltage and current settings, transfer mode (e.g., short circuit, pulse, spray, pulse), and so forth. In particular, the welding system 10 allows for MIG welding (e.g., pulsed MIG, spray, short circuit, Regulated Metal Deposition (i.e., RMD®)) with electrodes 18 (e.g., welding wires) of various materials, such as steel or aluminum, to be channeled through the torch 16. The weld settings are communicated to control circuitry 30 within the power source 12. Additionally, or in the alternative, the control circuitry 30 is within the wire feeder 14, the torch 16, the gas supply 20, or another component of the welding system 10.

The control circuitry 30, described in greater detail below, operates to control generation of welding power output that is applied to the electrode 18 by power conversion circuitry 32 for carrying out the desired welding operation. In some embodiments, the control circuitry 30 may be adapted to regulate a pulsed MIG welding regime that may have aspects of short circuit transfer and/or of spray transfer of molten metal from the welding wire to a molten weld pool of a progressing weld. As described more fully below, such transfer modes may be controlled during operation by adjusting operating parameters of current and voltage pulses for arcs 24 developed between the electrode 18 and the work piece 26. "Pulsed welding" or "pulsed MIG welding" refers to techniques in which a pulsed power waveform is generated, such as to control deposition of metal droplets into the progressing weld pool. In a particular embodiment of the invention, a pulsed welding regime may be implemented in which the weld current of the arc is controlled to a desired current during anomalous cathode events that affect the weld voltage. That is, the weld current may be controlled independent of the weld voltage during the anomalous cathode event.

The control circuitry 30 is coupled to the power conversion circuitry 32, which supplies the weld power (e.g., pulsed waveform) that is applied to the electrode 18 at the torch 16. The power conversion circuitry 32 is coupled to a source of electrical power as indicated by arrow 34. The power applied to the power conversion circuitry 32 may originate in the power grid, although other sources of power may also be used, such as power generated by an engine-driven generator, batteries, fuel cells or other alternative sources. Components of the power conversion circuitry 32 may include choppers, boost converters, buck converters, inverters, and so forth.

The control circuitry 30 controls the current and/or the voltage of the weld power supplied to the torch 16. The control circuitry 30 may monitor the current and/or voltage of the arc 24 based at least in part on one or more sensors 36 within the wire feeder 14 or torch 16. In some embodiments, a processor 38 of the control circuitry 30 determines and/or controls the arc length or electrode extension based at least in part on feedback from sensors 36. The arc length is defined herein as the length of the arc between the electrode 18 and the work piece 26. The processor 38 determines and/or controls the arc length or electrode extension utilizing data (e.g., algorithms, instructions, operating points) stored in a memory 40. The data stored in the memory 40 may be received via the operator interface 28, a network connection, or preloaded prior to assembly of the control circuitry 30. Operation of the power source 12 may be controlled in one or more modes, such as a constant voltage (CV) regulation mode in which the control circuitry 30 controls the weld voltage to be substantially constant while varying the weld current during a welding operation. That is, the weld current may be based at least in part on the weld voltage. Additionally, or in the alternative, the power source 12 may be controlled in a current control mode in which the weld current is controlled independent of the weld voltage. In some embodiments, the power source 12 is controlled to operate in a constant current (CC) mode where the control circuitry 30 controls the weld current to be substantially constant while varying the weld voltage during a welding operation.

Figure 2:
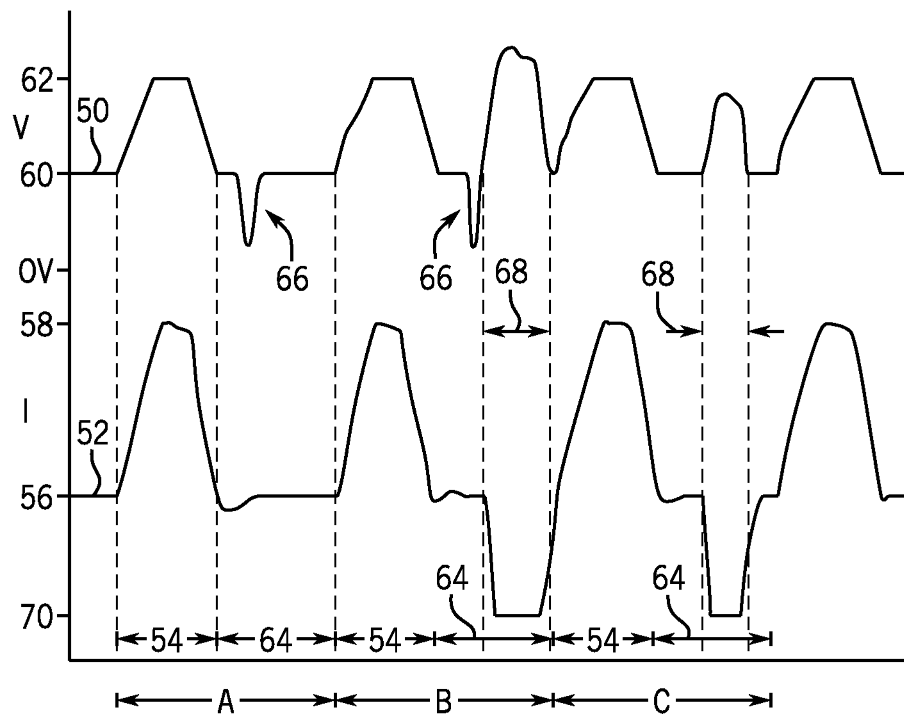
FIG. 2 is a chart illustrating pulsed voltage and current waveforms during anomalous cathode events.

FIG. 2 is an embodiment of weld voltage 50 and weld current 52 waveforms of a pulsed welding process. The weld voltage 50 waveform and the weld current 52 waveform over pulse periods A, B, and C are shown. During a peak phase 54 of each pulse period, the control circuitry increases the weld voltage 50 supplied to the electrode, forming and/or separating a molten ball from the tip of the electrode to be deposited on the work piece or weld pool. The weld voltage 50 increases from a background voltage level 60 to approximately a peak voltage 62, thereby increasing the weld current 52 from a background current level 56 to approximately a peak current 58. The weld voltage 50 and weld current 52 may decrease from peak levels to a background phase 64. In other words, the weld current 52 is indirectly controlled during the peak phase 54 based at least in part on the weld voltage 50. In some embodiments, during the background phase 64, the molten ball may briefly join the electrode to the weld pool in a short circuit event 66 that decreases the weld voltage 50. In some embodiments, the molten ball is deposited from the electrode to the weld pool without the short circuit event 66. In the background phase 64, the control circuitry may generally maintain the weld voltage 50 at the background voltage 60, and the weld current 52 may remain at approximately the background current 56 to maintain an arc between the electrode and the work piece. The weld power via the weld current 52 and the weld voltage 50 may begin forming another molten ball at the tip of the electrode during the background phase 64. Accordingly, each pulse period may generally be described by a peak phase 54 during which the weld voltage 50 is increased and a background phase 64 during which the weld current 52 is desired to be at a substantially constant current value.

As discussed herein, the term pulse period is not intended to be limited to a cycle (e.g., peak phase 54, background phase 64) of the weld voltage 50 and weld current 52 waveforms for only a pulsed MIG welding regime. As may be appreciated, the weld voltage 50 and the weld current 52 of various MIG welding processes (e.g., pulsed MIG, short circuit, spray, and RMD) are cyclical. That is, each cycle of a MIG process includes one or more peak phases 54 with an elevated weld voltage 50 and one or more background phases 64 with a desired substantially constant weld current 52. For example, a peak phase 54 may include the pinch, clear, and/or ball stages of the RMD process, and the background phase 64 may include the blink, background, pre-short, and/or wet stages of RMD process. As utilized herein, the term pulse period, may include, but is not limited to, a cycle (e.g., one or more sequences of a peak phase 54 and a background phase 64) of a pulsed MIG welding regime, a short circuit process, a spray process, or an RMD process, or any combination thereof.

As may be appreciated, the processor 38 of the control circuitry 30 may control the weld voltage 50 and weld current 52 values within different ranges based at least in part on the desired weld parameters input via the operator interface, the electrode, the feed rate of the electrode, the gas, the work piece, or any combination thereof. For example, the background current level 56 may be between approximately 25 to 250 amps. The peak current 58 may be between approximately 300 to 700 amps. In some embodiments, the background voltage level 60 may be between approximately 15 to 25 volts, and the peak voltage 62 may be between approximately 25 to 40 volts.

The weld voltage 50 and weld current 52 waveforms of a pulsed process may generally resemble pulse period A. However, anomalous cathode events 68 may begin in the background phase 64 of some pulse periods and persist for various durations. Some anomalous cathode events 68 may persist only during a portion of the background phase 64, and other anomalous cathode events 68 may persist through the background phase 64 and into a portion of the peak phase 54. The anomalous cathode events 68 may affect the weld voltage 50 and weld current 52 as shown in pulse periods B and C. The anomalous cathode events 68 of pulse periods B and C illustrate the weld voltage 50 and weld current 52 waveforms without application of the control algorithm by the control circuitry as described below. After the peak phase 54, the weld voltage 50 may rise in the anomalous cathode event 68. The unmitigated anomalous cathode event 68 affects the arc between the electrode and the work piece by restricting or narrowing the arc. That is, the arc during the anomalous cathode event 68 of pulse period B may be relatively narrow compared to the relatively wide and/or bell shaped arc during the background phase 64 of pulse period A. Without the control algorithm described below, the weld current 52, which is controlled based on the weld voltage 50, may decrease to low current level 70 while the control circuitry attempts to maintain the weld voltage 50 at the desired background voltage 60. Effects of the unmitigated anomalous cathode event 68 on the weld process may include, but are not limited to, increased occurrence of spatter, inconsistent ball transfer, irregular weld appearance, decreased arc stability, or an increased probability of subsequent anomalous cathode events 68, or any combination thereof.

Figure 3:
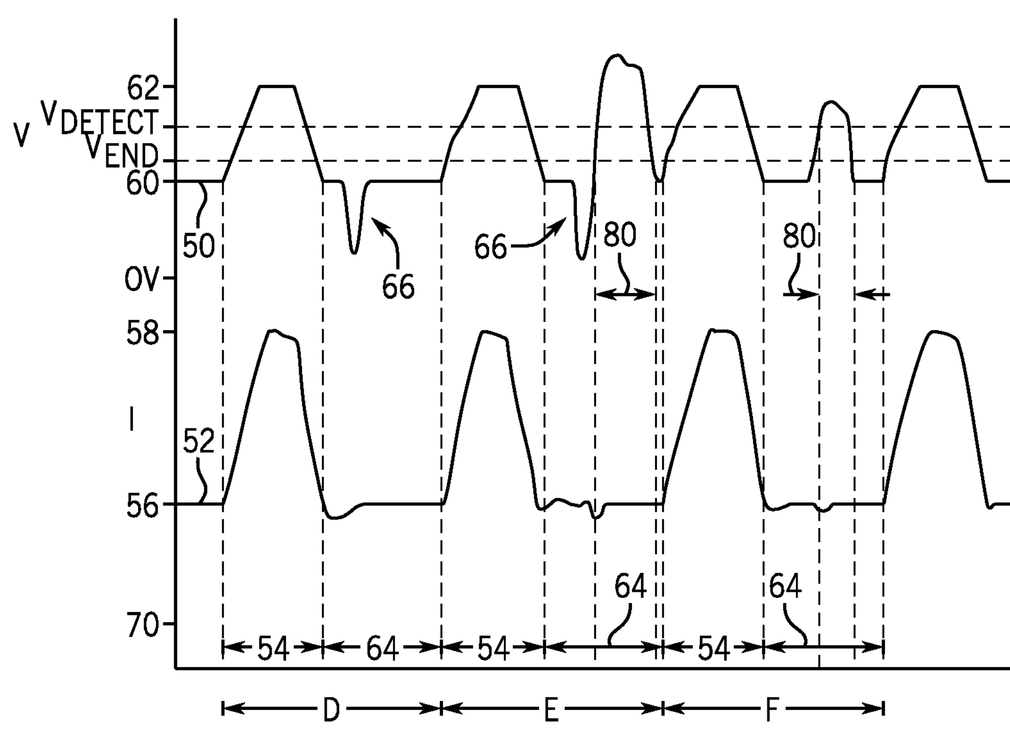
FIG. 3 is a chart illustrating pulsed voltage and current waveforms with a controlled current waveform during anomalous cathode events.

The processor 38 of the control circuitry 30 may determine the occurrence of anomalous cathode events and control the weld current 52 with the control algorithm to decrease the effects on the weld process. FIG. 3 illustrates an embodiment of weld voltage 50 and weld current 52 waveforms of the pulsed process over pulse periods D, E, and F of a welding process. Pulse periods E, F, and G may have substantially uniform pulse durations. The control circuitry monitors the weld voltage 50 to detect the start (e.g., rising weld voltage 50) of an anomalous cathode event 80. In some embodiments, the control circuitry monitors the weld voltage 50 for the start of the anomalous cathode event 80 only during the background phase 64 and/or not during the peak phase 54. The processor 38 of the control circuitry 30 may compare the weld voltage 50 to a detect voltage (e.g., $V_{detect}$), which may be exceeded at the onset of and during an anomalous cathode event 80. When the weld voltage 50 is approximately greater than the detect voltage (e.g., during the anomalous cathode event 80), the processor 38 of the control circuitry 30 may control the weld current 52 based at least in part on a control algorithm stored in the memory 40, rather than controlling the weld current 52 based on the weld voltage 50. For example, the control algorithm may direct the control circuitry to control the weld current 52 to approximately the background current 56 or other desired current value during the anomalous cathode event 80 despite deviations of the weld voltage 50 from the background voltage 60. A duration of the anomalous cathode event 80 may include, but is not limited to, an interval (e.g., portion) of the background phase 64 less than approximately 10, 25, 50, or 75 percent or more of the background phase 64. The control algorithm may direct the processor 38 of the control circuitry 30 to control the weld current 52 during anomalous cathode events 80 in pulse periods E and F to approximately the same value during the background phase 64 as during pulse period D, thereby controlling the weld current 52 to be substantially unaffected by the rising weld voltage 50 during the anomalous cathode event 80. The control algorithm stored in the memory 40 may direct the processor 38 of the control circuitry 30 to control the weld current 52 to be independent of the weld voltage 50 during at least a portion of the anomalous cathode event 80. In some embodiments, the control algorithm directs the processor 38 of the control circuitry 30 to substantially maintain the weld current 52 at the background current 56 during the anomalous cathode event 80 when the weld voltage 50 is not near the background voltage 60.

The anomalous cathode event 80 may end when the weld voltage 50 drops below approximately an end voltage (e.g., $V_{end}$). If the anomalous cathode event 80 ends during the background phase 64, the control algorithm may direct the processor 38 of the control circuitry 30 to maintain the weld current 52 at the background current 56 or another predetermined dynamic current value based on the operating point of the electrode for the remainder of the background phase 64. In some embodiments, the control algorithm may direct the processor 38 of the control circuitry 30 to resume the voltage regulation method (e.g., constant voltage) in place prior to the anomalous cathode event 80. If the anomalous cathode event 80 ends during another phase (e.g., peak phase 54), the control algorithm may direct the processor 38 of the control circuitry 30 to adjust the weld current 52 to an appropriate current level. For example, if the anomalous cathode event 80 ends in a peak phase 54, the control algorithm directs the processor 38 of the control circuitry 30 to control the weld current 52 to an appropriate current level between the background current 56 and the peak current level 58, thereby enabling the weld current waveform 52 to substantially maintain uniformity of the current waveform among pulse periods. For example, the background phase 64 may have the same background duration (e.g., approximately 1 to 20, 2 to 15, or 3 to 10 milliseconds) for each pulse period, and the peak phase 54 may have the same peak duration (e.g., approximately 0.5 to 5, 0.75 to 4, or 1 to 3 milliseconds). The control algorithm enables the processor 38 of the control circuitry 30 to control the weld current 52 during the anomalous cathode event 80 outside of a typical regulation mode (e.g., constant voltage regulation), thereby reducing the occurrence of spatter, increasing the consistency of ball transfer to the weld pool, improving the appearance of the weld, increasing arc stability, or decreasing probability of subsequent anomalous cathode events 80, or any combination thereof.

The detect voltage ($V_{detect}$) and the end voltage ($V_{end}$) may be based at least in part on the electrode properties, the gas utilized during the welding operation, the operating point of the electrode, and/or the operating point of the shielding gas. The operating point of the electrode and the operating point of the shielding gas may be empirically determined and stored in the memory 40 of the control circuitry 30. For example, the operating points may be stored in the memory 40 with the control algorithm. In some embodiments, $V_{detect}$ and/or $V_{end}$ may be greater than the background voltage 60, and less than the peak voltage 62. For example, $V_{detect}$ may be between approximately 25 to 35 V, and $V_{end}$ may be between approximately 15 to 25 V. Voltage values for $V_{detect}$ may be approximately 1, 2, 3, 4, 5, 6, 7, 8, 9, or 10 V or more than the background voltage 60. Additionally, or in the alternative, $V_{detect}$ may be approximately 1, 2, 3, 5, 10, or 20 percent greater than the background voltage 60. In some embodiments, values for $V_{detect}$ and/or $V_{end}$ for various combinations of electrodes and gases may be loaded from a memory into the control circuitry prior to or during a welding process. The values for $V_{detect}$ and/or $V_{end}$ may be simulated voltages based at least in part on the current feedback, electrode extension, or arc length, or any combination thereof. The weld voltage 50 during a non-anomalous cathode pulse periods (e.g., pulse period D) may have voltage components across the electrode (e.g., $V_{EE}$), the arc (e.g., $V_{arc}$, $V_{anode}$, $V_{cathode}$), and the work piece. In some embodiments, the simulated voltage may be based at least in part on a sum of the separately calculated voltage components of the weld voltage 50 during one or more non-anomalous cathode pulse periods. For example, the simulated voltage may be based at least in part on feedback from a state observer (e.g., Kalman filter) that receives real-time feedback from at least one of the control circuitry, the power conversion circuitry, and the sensors. The processor 38 of the control circuitry 30 may determine the electrode extension and/or arc length based at least in part on feedback from the sensors in the torch.

FIG. 4 illustrates an embodiment of a method 100 for operating the welding system and initiating the control algorithm described above. The operator may set (block 102) weld parameters for the welding operation via the operator interface and/or via coupling components (e.g., wire feeder, torch, gas supply) to the power source. Weld parameters may include, but are not limited to, the current, voltage, transfer mode, pulse duration, pulse frequency, work piece material, electrode, and supply, or any combination thereof. The power source supplies (block 104) power to the torch, and the operator may engage (block 106) a trigger to initiate an arc between the electrode of the torch and the work piece. During a background phase (block 108), the weld power supplied to the electrode via the torch forms (block 110) a ball and maintains the arc between the electrode and the work piece. In some embodiments, the processor 38 of the control circuitry 30 may control the weld current and weld voltage to substantially constant values during the background phase. After the processor 38 of the control circuitry 30 determines (node 112) that the background phase is over (e.g., time t in background phase has exceeded a background interval of the pulse period), the control circuitry 30 may transition to the peak phase (block 114). During the peak phase (block 114), the molten ball may separate (block 116) from the electrode for deposit in the weld pool. The control circuitry 30 may control the weld current and weld voltage to increase during the peak phase. The background phase (block 108) and peak phase (block 114) may repeat for the duration of the weld process while the operator engages the trigger (block 106) or automation interface engages the welding system. In some embodiments, the processor 38 of the control circuitry 30 may control the weld current and weld voltage with additional phases between the repeated background and peak phases.

During the background phase (block 108), the processor 38 of the control circuitry 30 monitors the weld voltage. At node 118, the processor 38 of the control circuitry 30 compares the weld voltage to the voltage detect value ($V_{detect}$) to determine if an anomalous cathode event is occurring. $V_{detect}$ may be dynamically determined and/or loaded from a memory of the control circuitry. If the weld voltage is greater than the voltage detect value, the processor 38 of the control circuitry 30 utilizes the control algorithm 120 to mitigate effects of the anomalous cathode event on the weld process. In the control algorithm 120, the processor 38 of the control circuitry 30 stops (block 122) or suspends the active voltage regulation method. For example, the processor 38 of the control circuitry 30 may utilize a voltage regulation method (e.g., constant voltage method) to control the weld voltage and/or weld current to maintain a desired arc length or electrode extension. In some embodiments, the processor 38 of the control circuitry 30 may reset (block 124) the active voltage regulation method, such as by clearing stored data (e.g., running average, sensor feedback) from the memory 40. Resetting the active voltage regulation method may increase the accuracy and/or reliability of the voltage regulation method, thereby increasing the stability of the arc. For example, the active voltage regulation method may utilize previously measured current and/or voltage measurements stored in the memory 40. The conditions of the arc (e.g., measured current and/or voltage) during the anomalous cathode event are different than during the background phase of a non-anomalous cathode event (e.g., pulse period D). Accordingly, the previously measured current and/or voltage measurements stored in the memory 40 utilized for the active voltage regulation method are reset (block 124) to enable the active voltage regulation method to be resumed at block 132 without utilizing measured current and/or voltage measurements from the anomalous cathode event for the active voltage regulation method.

The control algorithm 120 directs the processor 38 of the control circuitry 30 to adjust (block 126) the weld current to the desired background current, a predetermined current value, or a dynamically determined current value. In some embodiments, the desired background current may be approximately the same as the background current during the prior background phase from the previous pulse period. The processor 38 of the control circuitry 30 may increase or decrease the weld current to the desired background current at a ramp rate (e.g., linear) based at least in part on the electrode, wire, or any combination thereof. The ramp rate may be stored in the memory 40 or otherwise determined within the control circuitry 30 during the background phase. Additionally, or in the alternative, the ramp rate may be empirically determined and stored in the memory 40 with the algorithm.

If the processor 38 of the control circuitry 30 determines (node 128) the background phase is not over (e.g., time t in background phase has not exceeded background interval), then the processor 38 of the control circuitry 30 determines (node 130) whether the weld voltage is less than the end voltage $V_{end}$. If the weld voltage is less than $V_{end}$, the control algorithm may determine that the anomalous cathode event has ended, and the control algorithm directs the processor 38 of the control circuitry 30 to resume (block 132) the active voltage regulation method and return to block 110. If the weld voltage is greater than $V_{end}$, the control algorithm may adjust (block 126) the weld current to the background current, and cycle through nodes 128 and 130 until the background phase ends or the weld voltage is less than $V_{end}$ (e.g., anomalous cathode event ends). If the background phase ends while the weld voltage is greater than $V_{end}$, the control algorithm directs the control circuitry to adjust (block 134) the weld current for the next phase (e.g., peak phase 114) and resume (block 136) the active voltage regulation method. For example, if the anomalous cathode event persists into the peak phase 114, the control algorithm directs the processor 38 of the control circuitry 30 to increase the weld current to the appropriate weld current to substantially correspond with prior peak weld current waveforms, thereby reducing the effect of the anomalous cathode event on the peak phase of the weld current.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:

a power source configured to supply a weld power to a torch in a plurality of pulse periods, wherein each pulse period of the plurality of pulse periods comprises a peak phase and a background phase, and the weld power comprises a weld current and a weld voltage; and a control circuitry coupled to the power source, wherein the control circuitry is configured to:

determine whether a voltage value of the weld voltage is greater than a detect voltage during the background phase, the detect voltage being greater than a background voltage value, and in response to determining the voltage value is greater than the detect voltage, control the power source to hold the weld current at a background current value until the background phase ends or the voltage value is less than an end voltage, the end voltage being less than the detect voltage.

2. The welding system of claim 1, further comprising a sensor coupled to the control circuitry, wherein the voltage value is determined based at least in part on feedback from the sensor.

3. The welding system of claim 1, wherein the power source is configured to operate in a plurality of control modes during the background phase, and the control circuitry is configured to change operation of the power source to a current control mode in response to determining the voltage value is greater than the detect voltage, the weld current being controlled independent of the weld voltage during operation in the current control mode.

4. The welding system of claim 3, wherein the control circuitry is configured to:

change operation of the power source to a constant voltage mode during the peak phase, and clear stored data from a memory of the power source in response to determining the voltage value is greater than the detect voltage, the weld voltage being controlled to a constant voltage value while the weld current is allowed to vary during operation in the constant voltage mode, and the stored data corresponding to the control of the weld voltage during operation in the constant voltage mode.

5. The welding system of claim 3, wherein the voltage value comprises a first voltage value, and the control circuitry is further configured to:

in response to changing operation of the power source to the current control mode, determine whether the weld voltage has decreased to a second voltage value that is less than the end voltage during the background phase, and in response to determining the weld voltage has decreased to the second voltage value that is less than the end voltage during the background phase, change operation of the power source to the constant voltage mode.

6. The welding system of claim 1, wherein a background duration of the background phase of each pulse period is uniform for each pulse period of the plurality of pulse periods, and a peak duration of the peak phase of each pulse period is uniform for each pulse period of the plurality of pulse periods.

7. A welding system, comprising:

a power source configured to supply a weld power to a torch in a plurality of pulse periods, wherein each pulse period of the plurality of pulse periods comprises a peak phase and a background phase, and the weld power comprises a weld current and a weld voltage;

a sensor configured to detect a voltage value of the weld voltage during the background phase of a first pulse period of the plurality of pulse periods; and a control circuitry coupled to the power source, wherein the control circuitry comprises processing circuitry and memory circuitry storing machine executable instructions that, when executed by the processing circuitry, causes the processing circuitry to:

determine whether a voltage value of the weld voltage is greater than a detect voltage during the background phase, the detect voltage being greater than a background voltage value and marking an onset of an anomalous cathode event, and in response to determining the voltage value is greater than the detect voltage, control the power source to hold the weld current at a background current value until the background phase ends or the voltage value is less than an end voltage, the end voltage being less than the detect voltage.

8. The welding system of claim 7, wherein the background current value comprises a current value of the weld current supplied during the background phase of the first pulse period prior to the anomalous cathode event.

9. The welding system of claim 7, wherein the memory circuitry further stores machine executable instructions that, when executed by the processing circuitry, causes the processing circuitry to: control the power supply to output the weld current at a desired value during a portion of the background phase of the first pulse period in response to determining the voltage value is greater than the detect voltage, wherein the weld current is controlled independently of the weld voltage during the portion of the background phase.

10. The welding system of claim 7, wherein the detect voltage is stored in the memory circuitry, and wherein the sensor is configured to compare the voltage value of the weld voltage to the detect voltage stored in the memory circuitry.

* * * * *